United States Patent Office 3,790,606
Patented Feb. 5, 1974

3,790,606
ALKOXYLATED MANNICH COMPOSITIONS
AND DERIVATIVES THEREOF
Lucien Sellet, Saddle River, N.J., assignor to Diamond
Shamrock Corporation, Cleveland, Ohio
No Drawing. Continuation-in-part of application Ser. No.
573,789, Aug. 22, 1966. This application Sept. 30,
1970, Ser. No. 76,988
Int. Cl. C07c 141/04; C14c 11/00; D06m 13/46
U.S. Cl. 260—401                 2 Claims

ABSTRACT OF THE DISCLOSURE

Treating agents are prepared by condensing Mannich Base compounds with alkylene oxide and thereafter reacting the alkoxylated compounds with quaternizing reagents. Mannich Base compounds are obtained by condensation of phenols with aldehydes and alkanolamines.

---

This application is a continuation-in-part of my copending application Ser. No. 573,789, filed Aug. 22, 1966, now abandoned.

The present invention relates to novel treating agents, which are reaction products of hydroxyl containing nitrogen compounds with acids or quaternizing agents, their utilization in the treatment of fibrous, porous and nonporous substrates, and a process for their preparation.

This invention further relates to providing for improved leather, paper, glass, plastic, rubber, wood and textile treating agents which impart improved properties when applied to said substrates in such diverse operations as tanning, retanning, dyestuff and pigment binding, dyeing, dispersing, coating and finishing, as well as in applications where treating agent properties such as dispersibility, dyeability, elongation, flexibility adhesion, antistatic, abrasion resistance, bonding and the like are desired. It is intended that the detailed description and specific examples do not limit the invention but merely indicate preferred embodiments thereof since changes and modifications within the scope of this invention will become apparent to those skilled in the art.

The above have been unexpectedly and successfully achieved in the following manner. I have prepared and utilized in the treatment of various fibrous, porous and nonporous substrates such as films, sheets, solids, fibers and like materials, treating agents which can be broadly described as hydroxyl containing nitrogen compounds which are the alkoxylation products of polyhydroxy compounds containing methylenic alkanolamine radical substituents such as those obtained when carrying out the Mannich reaction using aryl hydroxy compounds, aldehydes or aldehyde liberating compositions and alkanolamines. Also, I have prepared and used as treating agents, addition salts and quaternary ammonium salts of the hydroxyl containing nitrogen compounds.

The treating agents of the present invention include hydroxyl containing nitrogen compounds which are alkoxylated derivatives of Mannich Base compounds. Such Mannich Base compounds are the reaction products of (1) a phenol having at least one reactive hydrogen atom present in the phenol nucleus, (2) at least one aldehyde or aldehyde liberating composition and (3) at least one alkanolamine such as a monoalkanolamine or dialkanolamine wherein the alkylene group contains at least two carbon atoms. The (2) aldehyde or aldehyde liberating composition and (3) alkanolamine are present in approximately equimolar amounts with respect to each other. Further, there is present one mole of the (2) aldehyde or aldehyde composition and one mole of (3) alkanolamine for each reacting reactive hydrogen atom present in the phenol nucleus. By reacting reactive hydrogen atoms present in the phenol nucleus is meant the number of reactive hydrogen atoms in the phenol nucleus which are chosen for reaction with aldehyde and alkanolamine in the Mannich reaction. For example, phenol has three reactive hydrogen atoms. One may choose to react one, two or three of these reactive hydrogen atoms by the Mannich reaction. The phenol nucleus in a 2,4- or 2,6-disubstituted phenol has only one reactive hydrogen atom so one can only choose to react the only reactive hydrogen. The phenol nucleus in a complex phenol such as a novolak may contain $n$ reactive hydrogen atoms so one can choose to react from one to $n$ reactive hydrogen atoms in the phenol nucleus. The manner in which a reactive hydrogen atom in the phenol can be reacted can be varied. For example, a reactive hydrogen atom in the alkanolamine can be reacted with the aldehyde and the resulting reaction product can then be reacted with the reactive hydrogen atom in the phenol nucleus. The reactive hydrogen atom in the phenol nucleus can be reacted with the aldehyde or aldehyde composition to obtain an alkylolated phenol which can then be reacted with a reactive hydrogen atom in the alkanolamine. The phenol, alkanolamine and aldehyde or aldehyde composition can be combined and reacted in one step. The order in which the phenol, alkanolamine and aldehyde or aldehyde composition are reacted in the Mannich reaction is determined by factors such as convenience, properties of the reactants, properties desired in the Mannich Base compound or the like.

The hydroxyl containing nitrogen compounds described above can be used as a treating agent itself or can be modified to produce other types of treating agents. For example, the hydroxyl containing nitrogen compounds can be reacted with acids or quaternizing reagents to produce treating agents. Reaction of the acid or quaternizing reagent is with the nitrogen atoms present in the treating agent. The acid or quaternizing reagent is employed in an amount sufficient to react with at least one of the nitrogen atoms present in the treating agent. When desired, all of the nitrogen atoms in the treating agent can be converted to acid addition salts or quaternary nitrogen atoms by employing sufficient acid or quaternizing reagent. The foregoing treating agents as well as processes for their manufacture and their uses are described in greater detail below.

These novel treating agents have outstanding properties which are in part attributed to the hydroxyl containing nitrogen compounds. Such hydroxyl containing nitrogen compounds can be obtained by alkoxylation of the Mannich reaction products of aryl hydroxyl compounds such as phenols with aldehydes and alkanolamines so as to provide for at least one alkoxylated substituent for each phenolic, hydroxyl group present in Mannich Base compound, i.e., there may optionally be additional alkoxylated substituents on such hydroxyl group and also one or more on each alkanol group present in the alkanolamine radical substituents attached to the alkoxylated phenolic nucleus. These hydroxyl containing nitrogen compounds are described below in the section entitled Hydroxyl Containing Nitrogen Compounds. Hydroxyl containing nitrogen compounds useful in the present invention include alkoxylated phenols having at least one methylenic dialkanolamine radical substituent, methylenic oxyalkylated dialkanolamine radical substituent, methylenic monoalkanolamine radical substituent or methylenic oxyalkylated monoalkanolamine radical substituent attached to the alkoxylated phenolic nucleus. Useful alkoxylated phenols include alkoxylated alkylphenols, alkoxylated polynuclear phenols, alkoxylated phenyl phenols, alkoxylated phenols linked by alkylene bridges, alkoxylated fused phenols and the like having at least one alkoxylated phenolic hydroxyl group and at least one methylenic alkanolamine substituent or at least one oxyalkylated methylenic alkanolamine radicals substituent. It is to be understood that mixtures of the above-mentioned hydroxyl containing nitrogen compounds can be used in the preparation of treating agents disclosed in this invention. Treating agents can be prepared by quaternization of the hydroxyl containing nitrogen compounds themselves or by addition of acids to form salts.

These treating agents are unique in that they are not sensitive to water and can be applied from aqueous solutions or dispersions. A further advantage of these treating agents is that they can be prepared in the form of quaternary ammonium salts or acid addition salts and applied to substrates in the form of solutions or dispersions. The treating agents may be used directly or in the form of their salts or quaternaries. They may be formulated with acids, surfactants, solvents and the like to obtain formulations for applications where specific requirements such as water-solubility, solvent solubility, dispersibility or the like are required.

Additionally, as disclosed in my co-pending application Ser. No. 573,789, filed Aug. 22, 1966, now abandoned, and which is hereby incorporated by reference, it is possible to react the hydroxyl containing nitrogen compounds disclosed herein with isocyanate terminated urethane prepolymers, and as an optional third ingredient acids or quaternizing reagents.

Since the treating agents enhance properties such as film forming, coating, dyeability, dispersibility, adhesion, abrasion resistance, washfastness, antistatic, light stability and other properties as well as acting as carriers and/or binders for pigments and dyestuffs, it is a definite advantage to be able to vary the nature and the properties of the hydroxyl containing nitrogen compounds employed as treating agents and in the preparation of the treating agents disclosed in this invention as described hereinafter.

HYDROXYL CONTAINING NITROGEN COMPOUNDS

The hydroxyl containing nitrogen compounds useful in the present invention are prepared by reacting (a) at least one mole of an alkylene oxide or mixtures thereof wherein each alkylene group in the oxide contains from two to 57 carbon atoms with (b) at least each phonolic hydroxyl group present in an aromatic Mannich Base compound having at least one phenolic hydroxyl group and at least one methylenic alkanolamine radical substituent attached to an aromatic ring present in the Mannich Base compound. Reaction of alkylene oxide with the phenolic hydroxyl groups in the Mannich Base compounds converts these groups to hydroxyalkyl phenoxy groups. When more than one mole of alkylene oxide per each phenolic hydroxyl group present in the aromatic Mannich Base compound is employed, the additional alkylene oxide reacts with the hydroxyalkyl phenoxy groups as well as the alkanol groups of the methylenic alkanolamine radical substituents present in the Mannich Base compound. Thus, the hydroxyl groups present in the hydroxyl containing nitrogen compound can contain alkylene oxide or polyoxyalkylene chains.

Aromatic Mannich Base compounds useful in preparing the abovementioned hydroxyl containing nitrogen compounds can be obtained by the Mannich reaction. The Mannich reaction has been described generally above and is described in greater detail below. Preparation of Mannich Base compounds can be achieved by the methods described below as well as the methods given in U.S. Pat. No. 2,033,092, Bruson, Mar. 3, 1936; U.S. Pat. No. 2,114,122, Bruson, Apr. 12, 1938 and U.S. Pat. No. 2,220,834, Bruson et al., Nov. 5, 1940. Formulas I to V inclusive illustrate the types of Mannich Base compounds obtained when from one to three moles of formaldehyde and from one to three moles of diethanolamine, present in approximately equimolar amounts with respect to each other, are condensed with one mole of phenol. For example, condensation of one mole of formaldehyde and one mole of diethanolamine with one mole of phenol yields nitrogen compounds of the type shown in Formulas I and II.

(I)

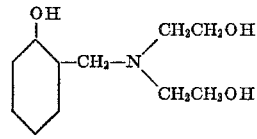

and (II)

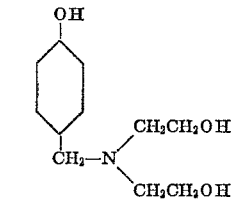

Likewise, when two moles of formaldehyde and two moles of diethanolamine are condensed with one mole of phenol, Mannich Base compounds of the types shown in Formulas III and IV are obtained.

(III)

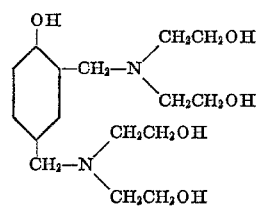

and (IV)

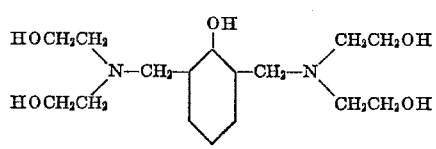

When three moles of formaldehyde and three moles of diethanolamine present in equimolar amounts are condensed with one mole of phenol, the Mannich Base compound shown in Formula V is obtained.

(V)

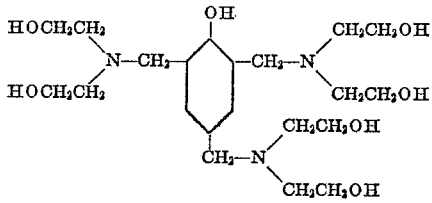

Formulas I to V inclusive illustrate various types of Mannich Base compounds obtained in the Mannich reaction of formaldehyde and diethanolamine with phenol. It is of course understood that, in practice, the Mannich Base compounds are not necessarily obtained in pure form, but quite often are obtained as mixtures of compounds with one particular type predominating. Further, it is to be understood that the above and subsequent structural formulas are set forth herein to facilitate an understanding of the present invention. They are not, however, to be construed as limiting the present invention to their precise structures.

Similar Mannich Base compounds are obtained when monoethanolamine, N-methyl monoethanolamine or N-ethyl monoethanolamine is substituted for diethanolamine in the Mannich reaction. Likewise alkanolamines such as dipropanolamines, monopropanolamines, N-alkyl monopropanolamines, dibutanolamines, monobutanolamines, N- alkyl monobutanolamines, monohexanolamine, monododecanolamine, their isomers and higher homologues or the like can be substituted for diethanolamine, e.g., diisopropanolamine.

Aldehydes or aldehyde compositions which provide aldehydes containing from one to seven carbon atoms can be used in the Mannich reaction. For example, formaldehyde can be used in the form of 30 to 40% aqueous solutions, 30 to 55% alcohol solutions with alcohols such as methanol, n-butanol, i-butanol or the like. Formaldehyde can also be used in any of its polymeric forms such as paraformaldehyde, trioxane, hexamethylene tetramine or the like. Other aldehydes such as acetaldehyde, butyraldehyde, heptaldehyde, furfuraldehyde, chloral, alpha-ethyl-beta-propylacrolein, benzaldehyde or the like can be substituted for formaldehyde in the Mannich reaction. Aldehyde compositions such as acetals which liberate such aldehydes can also be employed. Such aldehyde compositions may also include aldehyde and hydrogen chloride mixtures wherein the phenol is chloromethylated and then reacted with alkanolamine to obtain Mannich Base compounds.

Phenols such as alkylphenols, polynuclear phenols, polyphenyl phenols, phenols linked by alkylene bridges (novolaks), fused phenols and the like having at least one free phenolic hydroxyl group and at least one reactive hydrogen in the phenolic nucleus can be substituted for phenol in the Mannich reaction.

Mannich Base compounds similar to those shown in formulas I to V inclusive can be prepared from 3-alkylphenols such as 3-methylphenol (m-cresol), 3-n-pentadecyl phenol, their isomers, homologues, mixtures, and the like by condensing one mole of 3-alkylphenol with from one to three moles of an aldehyde and from one to three moles of alkanolamine, the aldehyde and alkanolamine being present in approximately equimolar amounts with respect to each other.

Other useful Mannich Base compounds can be prepared from 2-alkylphenols, 4-alkylphenols, 2,4-dialkylphenols and 2,6-dialkylphenols by use of the Mannich reaction. For example, 2-alkylphenols and 4-alkylphenols can be reacted with from one to two moles of an aldehyde and from one to two moles of diethanolamine, the aldehyde and alkanolamine being present in approximately equimolar amounts with respect to each other, to obtain Mannich Base compounds having from one to two methylenic diethanolamine radicals. 2-alkylphenols which can be used in the preparation of Mannich Base compounds include 2-methylphenol, 2-ethylphenol, 2-n-propylphenol, 2-i-propylphenol, 2 - n - butylphenol, 2-t-butylphenol, 2-n-pentylphenol, 2-n-hexylphenol, 2-n-heptylphenol, 2-n-octylphenol, 2-t-octylphenol, 2-n-nonylphenol, 2-i-nonylphenol, 2-n-decylphenol, 2-n-dodecylphenol, 2-n-tridecylphenol, 2 - n - tetradecylphenol, 2-n-pentadecylphenol, 2-n-hexadecylphenol, 2-n-octadecylphenol, 2-n-nonadecylphenol, 2-n-eicosylphenol, 2-n-docosylphenol, 2-n-triacontylphenol, their isomers, their mixtures and the like. The corresponding 4-n-alkylphenols, their isomers, their mixtures and the like can also be employed. Such monoalkylphenols are well known in the art, particularly, those containing branched substituents and are used extensively in the manufacture of surfactants, antioxidants and the like. Many of these alkylphenols can be prepared by alkylation of phenol with olefins containing from three to thirty carbon atoms. Usually alkylation procedures produce mixtures of 2- and 4-alkylphenols. Alkylphenols can be used in the form of these mixtures or the 2-alkylphenols can be separated from the 4-alkylphenols by distillation or other methods and used individually.

The corresponding 2,4-dialkylphenols and 2,6-dialkylphenols can be produced by alkylation methods similar to those described above, that is, by reaction of one mole of phenol with two moles of olefin containing from three to thirty carbon atoms and employed in the Mannich reaction. It is to be understood that dialkylphenols having dissimilar alkyl groups can be employed. For example, dialkylphenols such as 2-methyl-4-nonylphenol and 2-octyl-4-methylphenol can be used. Such phenols can be obtained by alkylation of the corresponding methylphenols. Dialkylphenols obtained by those alkylation methods can also be used as mixtures or the desired 2,4-alkylphenols may be separated from the 2,6-dialkylphenols and used individually. Such dialkylphenols contain only one reactive hydrogen atom and can react with only one mole of alkanolamine and one mole of aldehyde or aldehyde composition in the Mannich reaction.

It is to be understood that olefins employed in the preparation of the above alkylphenols can be either linear or branched chain olefins and that mixtures of such olefins can be used. Generally, α-olefins are preferred because of their high reactivity. Linear olefins obtained by the reaction of ethylene with metal alkyls such as the Ziegler type compounds or those obtained in the wax cracking of fats are particularly useful in the preparation of alkylphenols.

Other phenols useful in the Mannich reaction include o-phenylphenol and p-phenylphenol as well as phenols linked to aromatic groups by alkylene bridges such as those in α-methylbenzyl-o-phenol and α-dimethylbenzyl-o-phenol. These phenols can be alkylated to produce other types of phenols which are useful in the Mannich reaction. Formula VI illustrates a Mannich Base compound obtained by the reaction of one mole of α-methylbenzyl-o-phenol, one mole of formaldehyde and one mole of diethanolamine which is useful as a hydroxyl containing nitrogen compound in the present invention.

(VI)

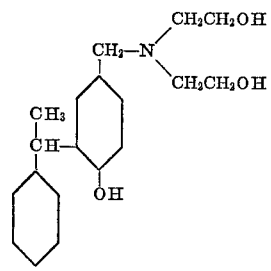

Additional examples of useful phenols are polynuclear phenols, polyphenyl phenols, phenols linked by alkylene bridges (Novolaks), fused phenols and the like such as diphenol, 4,4'-dihydroxy-diphenyl-dimethylmethane, 4,4'-dihydroxy-diphenyl-methyl-methane, 4,4' - dihydroxy-diphenylmethane, 1-naphthol, 2-naphthol, and the like having at least one reactive hydrogen therein.

Formula VII illustrates a Mannich Base compound obtained by bridging two phenols containing methylenic diethanolamine radicals by reaction with formaldehyde. This Mannich Base compound in which two phenolic nuclei or two phenolic moieties are linked by an alkylene bridge is particularly useful in the present invention. The Mannich Base compound shown in Formula VII contains two reactive hydrogen atoms which can be further substituted by the Mannich reaction if desired.

(VII)

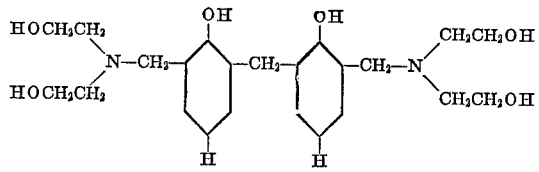

Phenols having two free phenolic hydroxyl groups and having at least one reactive hydrogen in the phenolic nucleus such as catechol, resorcinol, hydroquinone and the like can also be employed in the Mannich reaction to produce Mannich Base compounds useful in the present invention.

Thus, as shown by the aforedescribed examples of phenols which are useful herein, it is clear that wherever the term phenol is used, it is intended to encompass the phenols of the kind described above in addition to phenol itself and including phenols having one, two or more phenolic nuclei or moieties.

The above Mannich Base compounds can be prepared in the following manner by reaction of alkanolamine, aldehyde and phenol at about 5° C. to about 110° C. Usually from one to three moles of the desired alkanolamine and a solvent such as water or a monohydric alcohol are charged to a reactor equipped with agitator, reflux condenser and provision for external heating and cooling. The amine solution is cooled to about 5° C. to about 15° C. and a solution of from one to three moles of an aldehyde, said aldehyde being present in approximately equimolar amount with respect to the alkanolamine, in a solvent such as water or a monohydric alcohol is added to the cooled alkanolamine solution over a period of from one-half to two hours. The temperature is maintained below about 15° C. during this addition. A solution containing one mole of the desired phenol in a solvent such as water or a monohydric alcohol is then added to the reaction mixture over a period of from one-half to two hours while the temperature is maintained in the range of from about 15° C. to about 40° C. The resulting reaction mixture is then stirred for an additional fifteen minutes to two hours at a temperature of from about 15° C. to about 40° C., then heated to from about 60° C. to about 90° C. and held at this temperature for from one to four hours to complete reaction. The resulting product which is the Mannich Base compound is then heated under vacuum to remove water, monohydric alcohols and other volatile materials by distillation. Vacuum distillation is continued at about 90° C. to about 110° C. until the water content of the resulting Mannich Base compound is about 0.5% or less by weight.

Mannich Base compounds prepared by the foregoing procedure may contain available reactive hydrogen atoms in the phenolic moiety or phenolic moieties present in the Mannich Base compound. Such reactive hydrogen atoms will be in unsubstituted ortho and para positions in the phenolic moieties. It is to be understood that when said phenol in the Mannich Base compound contains a plurality of phenolic moieties, there will be a maximum of two available reactive hydrogens in the first phenolic moiety and only one in each of the remaining phenolic moieties. Formula VIII illustrates a Mannich Base compound in which the phenol has three phenolic moieties and four available hydrogens in the ortho and para positions.

(VIII)

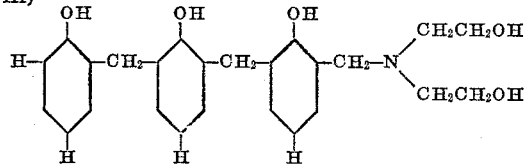

Likewise, Formula IX illustrates a Mannich Base compound in which the phenol has four phenolic moieties and five available reactive hydrogens in the ortho and para positions.

(IX)

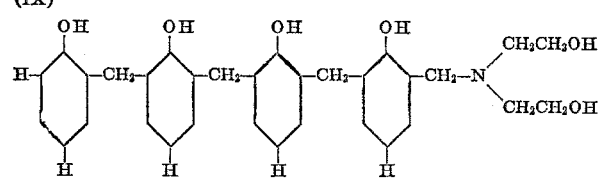

It is of course understood that replacement of available hydrogens with methylenic alkanolamine radicals in the phenolic moiety will reduce available unreacted hydrogen atoms for subsequent reaction. When desired, the above Mannich Base compound procedure may be employed to replace any available reactive hydrogen atoms in the Mannich Base compound with methylenic alkanolamine radicals. Likewise, such reactive hydrogen atoms can be reacted with bridging agents such as aldehydes, aldehyde compositions which liberate aldehydes and the like to produce dimers, trimers and higher polymers of the Mannich Base compounds.

The above described Mannich Base compounds can be prepared by procedures other than the Mannich reaction, e.g., chloromethylation and conversion of the resulting chloro derivatives to alkanolamines. Such procedures are equally useful in preparing Mannich Base compounds and can be employed to prepare isomers and homologues not readily obtainable by the Mannich reaction. For this reason, the present invention is not to be construed as limiting useful Mannich Base compounds to only those compounds obtained by the Mannich reaction. The term Mannich Base compound as used herein encompasses those compounds containing at least one phenolic hydroxyl group and at least one methylenic alkanolamine group attached to an aromatic nucleus present in the compound regardless of their preparation.

Hydroxyl containing nitrogen compounds useful in the present invention are prepared by condensing at least one mole of an alkylene oxide containing from two to 57 carbon atoms with each phenolic hydroxyl group present in the Mannich Base compound. Formula X illustrates an alkylene oxide adduct obtained when one mole of an alkylene oxide, $R_3O$ containing from two to 57 carbon atoms is condensed with a Mannich Base compound wherein $R_1$ and $R_2$ are alkylene groups containing from two to twelve carbon atoms and $R_1$ and $R_2$ can be alike or different.

(X)

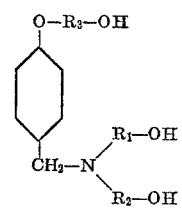

When the alkylene oxide adduct shown in Formula X is further condensed with an alkylene oxide, $R_4O$ containing from two to 57 carbon atoms, an adduct of the type shown in Formula XI is obtained:

(XI)

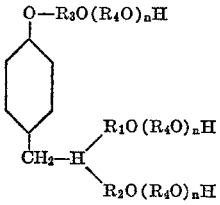

wherein $R_1$ and $R_2$ are alkylene groups containing from two to twelve carbon atoms and $R_1$ and $R_2$ can be alike or different; and the value of $n$ may vary from 0 to about 150 depending on the number of moles and the type of the alkylene oxide employed and may be a fractional quantity. For example, for $n$ to be greater than 1, $R_4O$ must be derived from ethylene oxide, propylene oxide, butylene oxide or styrene oxide. It is to be understood that Formulas X and XI are presented merely to illustrate two of the types of hydroxyl containing nitrogen compounds obtained by condensing one or more alkylene oxides with a Mannich Base compound of the type shown in Formula II above and are not to be construed as limiting this invention. Similar compounds can be prepared by alkoxylation of the other Mannich Base compounds shown in the formulas above, that is, Formulas I and III–IX (inclusive) as well as mixtures of such compounds.

It should be understood that when additional alkylene oxide, i.e., in excess of one mole per phenolic hydroxyl present in the phenolic nucleus, is introduced on to the Mannich Base compound, such alkylene oxide may distribute itself upon the Mannich Base compound in various ways. For example, instead of the alkylene oxide, $R_4O$ adding on the alkylene oxide, $R_3O$ and on to the hydroxyl groups of both of the alkanol groups of Formula XI, it can add on in other ways. For example, the alkylene oxide $R_4O$ can add entirely on to the alkylene oxide $R_3O$ or entirely upon one or both of the hydroxy groups of the alkanolamines. However, it is most likely that the alkylene oxide $R_4O$ adds uniformly on to all of the available hydroxyl groups, i.e., those from the prior alkylene oxide addition and from the alkanolamines. It is well known that the alkylene oxides condense preferentially with the phenolic groups, then with the primary alkanol groups and then with any secondary alkanol groups present. Hence, in preparing the hydroxyl containing compounds, the phenolic hydroxyl will react with the alkylene oxides in all cases. The large variety of types of alkoxylated Mannich Base compounds which can be employed precludes presentation of a general formula to cover all various types of useful hydroxy containing nitrogen compounds. The condensations between the alkylene oxides and Mannich Base compounds are carried out at a temperature of from about 30° C. to about 200° C. and the Mannich Base is dehydrated prior to condensation so that it has a water content of less than 0.5% by weight. When desired, an alkoxylation catalyst such as an alkali metal hydroxide, a basic catalyst or other suitable alkoxylation catalyst may be used. Typical catalysts include sodium hydroxide, sodium methylate, potassium hydroxide, boron trifluoride etherate and the like. These catalysts are employed in concentrations from about 0.01% by weight to about 1.0% by weight based on the weight of Mannich Base compound. Such alkoxylation catalysts are well known in the art. Frequently, the amine groups present in the Mannich Base compound provide sufficient basicity to promote the condensation of the phenolic hydroxyl groups with the alkylene oxide and catalyst addition will not be necessary during the initial phase of the condensation. However, if the reaction is sluggish at any point during the condensation, the reaction rate can be promoted by the addition of from about 0.01% by weight to about 1.0% by weight of one of the above-mentioned catalysts. Since the phenolic hydroxyl groups are more reactive than the hydroxyl groups present in the alkanol groups, the phenolic hydroxyl groups condense with alkylene oxide first to form hydroxyalkyl phenoxy groups. The alkylene oxide then condenses with free hydroxyls in the hydroxy alkyl groups and the free hydroxyls present in the alkanol groups to form an alkylene oxide or polyoxyalkylene chain so that each chain is terminated at one end by a free hydroxyl group. The resulting hydroxyl containing nitrogen compounds contain at least two free and reactive terminal hydroxyl groups. Such hydroxyl containing ntirogen compounds are, in effect, aromatic polyols having diol, triol, tetrol, pentol or higher hydroxyl functionalities.

The alkoxylation procedures employed in preparing these hydroxyl containing compounds are well known. Such procedures have been used extensively commercially in the preparation of nonionic surfactants, polyethers for polyurethane resins and other alkylene oxide derivatives. Typical alkoxylation procedures are described in U.S. Pat. No. 2,213,477—Steindorff et al. (Sept. 3, 1940).

As examples of alkylene oxides which may be employed in alkoxylation of Mannich Base compounds, any alkylene oxide containing from two to 57 carbon atoms may be used. Such alkylene oxides include ethylene oxide, propylene oxide, butylene oxide, hexylene oxide, octylene oxide, decylene oxide, dodecylene oxide, styrene oxide, glycidol, their isomers, their mixtures and the like. Other alkylene oxides include dicyclopentadiene dioxide, limonene dioxide, 3,4-epoxy-6-methylcyclohexyl - methyl-3,4-epoxy-6-methylcyclohexane-carboxylate, the diepoxide of diglycidyl derivative of 4,4'-dihydroxy-diphenyl-dimethyl methane, epoxidized soya bean oil, e.g., containing 7% by weight of oxide, monoglycidyl ethers of alcohols such as Epoxide 7, 8, 44 and 45 produced by Procter & Gamble Co., Cincinnati, Ohio, and the like. Epoxide 7 is a monoglycidyl ether of a mixture of $C_8$ to $C_{10}$ alcohols containing a total of from about 11 to 13 carbon atoms and having an oxide content of about 7% by weight. Epoxide 8 is a monoglycidyl ether of a mixture of $C_{12}$ to $C_{14}$ alcohols, containing a total of from about 15 to 17 carbon atoms and having an oxide content of about 5.6. Epoxide 44 is a monoglycidyl ether of a mixture of $C_{14}$ alcohols, containing an average of 17 carbon atoms and having an oxide content of about 5.2% by weight. Epoxide 45 is a monoglycidyl ether of a mixture of $C_{16}$ to $C_{18}$ alcohols containing a total of from about 19 to 21 carbon atoms and having an oxide content of about 4.3% by weight. If desired, alkylene oxides such as ethylene oxide, propylene oxide, butylene oxide and styrene oxide may be condensed sequentially. That is, the hydroxyl groups are reacted with one alkylene oxide and the resulting condensates reacted or capped with a dissimilar alkylene oxide. Likewise, the hydroxyl groups can be reacted with a plurality of moles of one alkylene oxide such as ethylene oxide, propylene oxide, butylene oxide and styrene oxide to form a polyoxyalkylene block and then with a plurality of moles of a second alkylene oxide such as ethylene oxide, propylene oxide, butylene oxide and styrene oxide to form a second polyoxyalkylene block so that each hydroxyl group is a chain which contains at least two dissimilar polyoxyalkylene blocks.

It is of course understood that the addition of alkylene oxides to the Mannich Base compound can be carried out either before or after the Mannich Base compound is reacted with the prepolymer. When carried out after reaction with the prepolymer, it is clear that there are fewer hydroxyl groups available for reaction.

The treating agent may be used directly or may be used to prepare treating agent formulations. The agent may be reacted with acids to form salts that are soluble or dispersible in water and/or other solvents. Inorganic acids such as hydrochloric acid, sulfuric acid, phosphoric acid, nitric acid and the like may be used to prepare salts of the treating agents. Likewise, organic acids such as formic acid, acetic acid, propionic acid, butyric acid, isobutyric acid, succinic acid, maleic acid and the like may be used in the preparation of salts of the treating agent. Such salts are prepared by reacting the acid and treating agent at a temperature of from about 25° C. to about 150° C. provided such conditions do not result in decomposition of the reactants or salts. Generally, one mole of the acid is reacted with at least one nitrogen atom present in the treating agent. When desired, all of the nitrogen atoms can be reacted. The salts can be formed in anhydrous or aqueous systems and solvents can be employed. Organic acids which form treating agent salts that disassociate on heating are particularly useful in the preparation of treating agent formulations. When desired, formulations of treating agents or their salts can be prepared with surfactants, alcohols, chlorinated solvents and the like. Such formulations are useful in specific applications such as padding, brushing, dipping, spraying, coating and the like.

Surfactants such as nonionic surfactants and cationic surfactants can be used in such formulations. Such surfactants include nonionic surfactants obtained from the reaction of alkylene oxides such as ethylene oxide, propylene oxide, butylene oxide, their mixtures and the like with alkylphenols, fatty acids, alcohols and the like and cationic surfactants such as those obtained from the reaction of alkylene oxides with nitrogen containing hydrophobic compounds and those obtained by quaternization of nitrogen containing compounds. Useful surfactants include the Pluronics which are block copolymers consisting of polypropylene oxide and polyethylene oxide blocks and having molecular weights of from about 600 to about 100,000. The Pluronics are polyalkylene glycol ethers. The Tergitol surfactants which are polyalkylene glycol ethers, produced by Union Carbide Corporation having molecular weights ranging from about 1000 to about 50,000 can also be used. Spans and Tweens such as sorbitan monoleate, sorbitan monolaurate, sorbitan monopalmitate, sorbitan monostearate, sorbitan tristearate, sorbitan trioleate, polyoxyethylene sorbitan monostearate, polyoxyethylene sorbitan monopalmitate, polyoxyethylene sorbitan monostearate and the like can also be used. Specific products include Span 20, Span 40, Span 60, Span 85, Tween 40, Tween 60 and Tween 80. Mixtures of the above surfactants can be used.

Solvents which can be employed in treating agent compositions include water, hydrophilic alcohols such as methanol, ethanol, 2-methoxyethanol, isopropanol and the like, hydrophobic alcohols, such as octyl alcohol, decyl alcohol and the like, chlorinated solvents such as chlorinated ethylenes, chlorinated benzenes and the like and hydrocarbon solvents such as petroleum ether, mineral spirits, benzene, toluene, xylenes, their mixtures and the like.

When the treating agents are formulated with solvents, from about 0% by weight to about 99% by weight of solvents based on the weight of the treating agent can be used. When the treating agents are formulated with surfactans from about 0% by weight to about 20% by weight of surfactants based on the weight of treating agent can be used.

Another embodiment of this invention includes quaternary compounds and their use as treating agents. These quaternaries are of two types, i.e., those prepared by reacting either (1) the hydroxyl containing nitrogen compound or (2) the reaction products of these nitrogen compounds and prepolymers with quaternizing reagents such as methyl chloride, methyl bromide, methyl iodide, ethyl chloride, dimethyl sulfate and the like. Generally one mole of the quaternizing agent is reacted with at least one nitrogen atom present in the hydroxyl containing nitrogen compound or its reaction product with a prepolymer. When desired all of nitrogen atoms present in the hydroxyl containing nitrogen compound or its reaction product with the prepolymer can be reacted with the quaternizing agent. The reaction is carried out under substantially anhydrous conditions at a temperature of from about 25° C. to about 100° C. for a period of from about one hour to about ten hours, but temperatures up to about 150° C. can be employed provided the reactants and products are heat stable and do not decompose. The reaction should be carried out under pressure when temperatures above 100° C. are used or volatile quaternizing reagents are employed. When desired, an inert solvent can be used, that is, a solvent which does not react with the quaternizing agent. Such quaternary compounds may be used directly as treating agents or can be formulated. The surfactants and solvents described above may be used in the formulation of treating agent containing quaternary compounds derived from the hydroxyl containing compounds.

Preparation of the hydroxyl containing nitrogen compounds and the quaternaries of the hydroxyl containing nitrogen compounds are generally carried out at atmospheric pressure and under a nitrogen or other inert gas blanket to provide substantially anhydrous conditions.

The treating agents disclosed in this invention are useful in the treatment of fibrous materials such as textiles, plastics, leather, paper and the like. Such agents include the hydroxyl containing nitrogen compounds, their acid addition salts, and their quaternaries.

These agents may be used to treat textile materials such as fibers, fabrics, and the like. Such textile materials include those derived from natural, man-made and synthetic fibers such as cotton, wool, silk, jute, sisal, hemp, fur, flax, kapok, rayon, cellulose acetate, cellulose triacetate, polyamides such as nylon, polyesters such as polyethylene terephthalate (Dacron), acrylics such as polyacrylonitrile, vinyl resins such as copolymers of polyvinyl chloride and polyvinyl acetate, copolymers of vinylidene chloride and vinyl chloride, copolymers of acrylonitrile and vinyl chloride and the like, polystyrene, polyethylene, polypropylene, polyurethane, glass, ceramic, asbestos, protein fibers such as vicara and peanut protein blends of these and the like. The agents can be applied to the textile material by any of the procedures and equipment usually employed in coating or treating fibrous materials, including spraying, padding, dipping, brushing, knife and doctor blades, air blades, roller coatings, curtain coatings, gravure coatings and the like. The agents can be applied in concentrated forms or in dilute forms such as solutions, emulsions and the like depending on the type of application. When the agents are applied in dilute form, the treated material is dried at room temperature or at elevated temperatures up to about 150° C. The quantity of treating agent used may vary from about 0.01% by weight to about 3.0% by weight based on the weight of the dry fiber. Generally from about 0.1% by weight to about 1.0% by weight based on the weight of dry fiber is used. When desired, other additives such as stabilizers, antioxidants, thickeners, softeners, lubricants and the like can be formulated with the treating agents provided such additives are compatible with the treating agents which are cationic materials, that is, such additives do not interreact with agents to form gels, precipitates or the like. The treating agents are particularly useful in the treatment of textile materials to improve their antistatic properties and the like. Further, the agents are useful in improving other fiber properties such as lubricity, handle, drape, softness, dyeability, fullness, abrasion resistance, finish, other desirable textile properties and the like.

These treating agents are also useful as treating agents in the production of leather from animal skins such as cowhides, calfskins, goatskins, horsehides, reptile skins, other animal skins and the like. As examples of skins, which may be treated with these agents, there may be mentioned skins of freshly killed animals, limed skins, pickled skins, tanned skins, partly tanned skins, partly dechromed skins, dechromed skins and the like. The agents can be employed as treating agents for leather pretanning agents, tanning agents, retanning agents and impregnating agents. They are particularly useful in the retaining of chrome stock leather. They produce retanned leathers having good break, excellent temper and tight grain. In retanning leather, skins which have been chrome tanned, split and shaved are used. Sides of leather vary in fiber density. There are looser areas in the leather, particularly in flank sections, where the fibers are long and less dense. The leather sides are retanned to upgrade the leather and to improve its quality and uniformity, that is, to fill and firm up looser areas.

The treating agents can be used in both two-step and one-step retanning processes. In a conventional two-step retanning process sufficient treating agent is applied in the form of a solution so that from about 0.1% to about 15% by weight of the treating agent based on the weight of leather is adsorbed in the pores of the leather. Usually chrome tanned stock containing 50% by weight of water based on its wrung, split shaved weight is employed. The leather is then treated with a solution containing an anionic tanning agent so that from about 0.1% by weight to about 15% by weight of the anionic tanning agent based on the weight of the leather is absorbed in the pores of the leather. The anionic tanning agent will then interreact in the pores with the cationic treating agent in situ in the leather to fill the pores. In a conventional one-step retanning process, leather is treated with the reaction product of a treating agent and an anionic tanning agent so that from about 0.1% by weight to about 30% by weight of the reaction product of the treating agent and anionic tanning agent based on the weight of leather is absorbed and fills the pores of the leather. The treating agents disclosed in this invention produce excellent results in both types of retanning processes.

As examples of anionic agents which may be used in both the two-step and the one-step processes for retanning, there may be mentioned naphthalene sulfonic acid and formaldehyde condensation products, sulfonated formaldehyde phenol condensation products, condensation products of sulfonated phenol and formaldehyde, sulfonated products of dihydroxyphenol sulfons, sulfonated products of dihydroxydiphenyl propane, preferably in the form of omega sulfonate forms, sulfonated dihydroxydiphenyl methane, phenolic derivatives possessing a urea-formaldehyde condensation bridge or any resin intermediate as a bridge formation, lignin sulfonates, vegetable tannins such as wattle extract solubilized by sodium bisulfite, quebracho extract solubilized by sodium bisulfite, synthetic tannins known as extract tannins and having at least one sulfo radical and the like.

Such anionic agents include exchange tannins and auxiliary tanning agents in general. These tannins include those having sulfo groups and anionic complexes or phenol, cresol, xylenol, naphthol, catechol, resorcinol, naphthalene, anthracene and benzidine with a methylene, sulfone, propane or sulfonimide bridge. Illustrative examples of these compounds are: disulfo dinaphthol methane, disulfo dinaphthyl methane, monosulfo dihydroxy diphenyl methane, a complex reaction product formed by reacting monosulfo dihydroxy diphenyl methane with formaldehyde to give the formula:

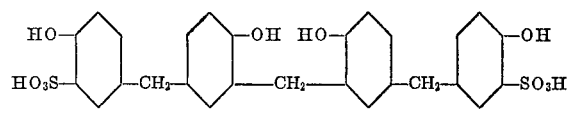

Omega sulfonate of dihydroxy dimethyl diphenyl sulfone, omega sulfonate of dihydroxy diphenyl sulfone, omega sulfonate of dihydroxy diphenyl propane, disulfo dihydroxy diphenyl propane, disulfo dihydroxy diphenyl sulfone, and complex compounds containing a benzidine radical with a sulfonimide-bridge as illustrated by the following compound can also be used:

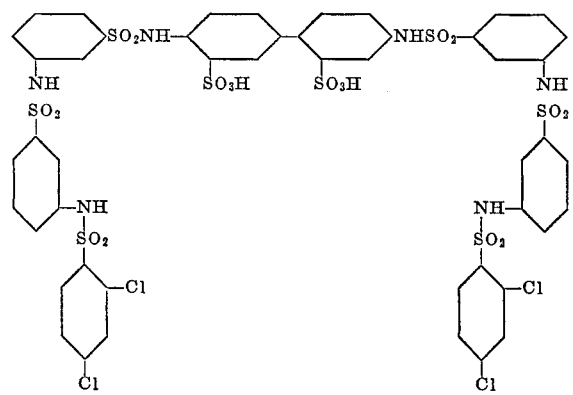

The treating agents disclosed in this invention are also useful in leather impregnation. Compositions containing from about 0.1 to about 30% by weight of treating agent based on the weight of leather can be prepared by diluting the treating agent with alcohol or alcohol-water mixtures. These compositions are used to impregnate and condition leather which has been previously fat-liquored. Excellent penetration of the leather with these compositions are obtained and no evidence of tackiness is noted after the impregnated leather has been dried. These compositions can be applied as spray coatings, curtain coatings, by drum applications and the like. Chrome tanned leather as well as vegetable tanned leather can be impregnated with these compositions.

Normally retanning operations are carried out at temperatures from about 40° F. to about 125° F. for periods of time ranging from about thirty minutes to about eight hours. Leather impregnation operations are usually carried out at about 40° F. to about 100° F. Drying operations are carried out by conventional methods.

For a fuller understanding of the nature and objects of this invention, reference may be made to the following examples which are given merely to illustrate the invention and are not to be construed in a limiting sense. All weights, proportions and percentages are by weight unless otherwise indicated. Likewise, all references to temperature are ° C. unless otherwise indicated.

EXAMPLE I (A) Preparation of a Mannich Base compound 315 g. (3 moles) of diethanolamine and 60 g. of methanol were charged into a glass flask equipped with agitator, reflux condenser and provisions for external heating. The charge was cooled to about 10° C. and 244.5 g. (3 moles) of aqueous formaldehyde (37% by weight active) was added at about 10° C. to about 15° C. slowly with agitation over sixty minutes. After addition was complete, a mixture of 282 g. (3 moles) of phenol and 25 g. of methanol was added at about 18° C. to about 22° C. over fifteen minutes with vigorous agitation. The resulting reaction mixture was agitated at about 18° C. to about 22° C. for one hour, heated to about 65° C. and agitated at about 65° C. for two hours to complete reaction.

The resulting reaction product which was the desired Mannich Base compound was then vacuum distilled to remove water, methanol and other volatile materials. Vacuum distillation was continued with heating until a pot temperature of 100° C. was reached. The reaction product was then held under vacuum at 100° C. for fifteen minutes and then cooled to 30° C. Analysis showed the water content of the Mannich Base compound was 0.5% by weight and the compound contained three hydroxyl groups, that is, one phenolic hydroxyl and two alkanol hydroxyl groups.

(B) Preparation of a hydroxyl containing nitrogen compound

A total of 211 g. (1 mole) of the Mannich Base compound obtained in part (A) above was charged into a glass flask equipped with agitator, reflux condenser and provisions for maintaining a nitrogen blanket over the compound and for external heating and cooling. The Mannich Base compound was heated to 95° C. with agitation under a nitrogen blanket. Propylene oxide was then introduced under the nitrogen blanket and condensed with the Mannich Base compound at a temperature of about 95° C. to about 110° C. to form the hydroxyl containing nitrogen compound which was a propoxylated adduct of the Mannich Base compound. Propylene oxide addition was continued under the above described conditions until a total of 116 g. (2 moles) of propylene oxide had reacted with the Mannich Base compound, that is, a total of two moles of propylene oxide was condensed with one mole of the Mannich Base compound. The resulting adduct of propylene oxide and Mannich Base compound was an aromatic polyol containing three terminal hydroxyl groups which consisted of two alkanol groups attached to a nitrogen atom and a hydroxyalkyl phenoxy group wherein the three hydroxyl groups had been partially reacted with propylene oxide, PrO, that is, 3 OH/1 PrO.

EXAMPLE II (A) Preparation of a Mannich Base compound 2967 g. (28.2 moles) of diethanolamine and 1250 g. of water were introduced into a reaction vessel equipped with agitator and were agitated with cooling. When the temperature of the diethanolamine mixture reached about 8° C. to about 10° C., a mixutre of 2303 g. (28.6 moles)

of aqueous formaldehyde (37% by weight active) and 1250 g. of water at about 10° C. were introduced over a period of one and one-half hours with good agitation. The temperature was maintained at about 10° C. during this addition. A mixture of 1328 g. (14.1 moles) of phenol and 117 g. of water was then introduced at about 10° C. over twenty minutes with agitation. The resulting reaction mixture was then agitated for an additional hour at about 10° C. 785 g. of methanol was then added to the reaction mixture and the resulting mixture was heated to about 60° C. to about 65° C. and stirred at about 65° C. for two hours. Water, methanol and other volatile materials present in the reaction mixture were then removed by vacuum distillation. The reaction mixture was slowly heated under vacuum to about 100° C. to about 110° C. The reaction mixture was then held for fifteen minutes at about 110° C. under full vacuum and then cooled to room temperature. The reaction product remaining in the flask was a Mannich Base compound having a water content of about 0.2% by weight and containing five terminal hydroxyl groups, that is, one phenolic hydroxyl group and four alkanol hydroxyl groups.

(B) Preparation of a hydroxyl containing nitrogen compound 328 g. (1 mole) of the Mannich Base compound obtained in part (A) above was introduced into a glass flask equipped with agitator, reflux condenser and provisions for maintaining a nitrogen blanket over the compound and for external heating and cooling. The Mannich Base compound was heated with agitation to about 95° C. under a nitrogen blanket and 58 g. (1 mole) of propylene oxide was introduced under the nitrogen blanket and condensed with the Mannich Base compound at a temperature of about 95° C. to about 110° C. An additional 87 g. (1.5 mole) of propylene oxide was then introduced to the reaction mixture and reacted at about 105° C. to about 110° C. The resulting product was a hydroxyl containing nitrogen compound which has the adduct of one mole of the Mannich Base compound and 2.5 moles of propylene oxide and contained five terminal hydroxyl groups, that is, four terminal alkanol hydroxyl group and one hydroxyalkyl phenoxy group wherein the five hydroxyl groups had been reacted with 1.5 moles of propylene oxide, PrO, that is, 5 OH/1.5 PrO.

EXAMPLE III (A) Preparation of a Mannich Base compound.

A mixture of 945 g. (9 mole) of diethanolamine and 390 g. of distilled water was charged into a glass flask equipped with agitator, reflux condenser and provisions for external heating and cooling. The charge was cooled to about 10° C. and 733.5 g. (9.05 mole) of aqueous formaldehyde solution (37% by weight active) and 398 g. of water was added slowly at about 10° C. to about 15° C. with agitation over a period of one hour. The formaldehyde and water solution was adjusted to a pH of 8.0 with sodium hydroxide solution prior to its addition to the diethanolamine solution. After reaction was complete, a mixture of 423 g. (4.5 moles) of phenol and 37.5 g. of water was added at about 10° C. to about 14° C. over fifteen minutes with vigorous agitation. The resulting reaction mixture was then agitated at about 10° C. to about 14° C. for one hour. 250 g. of methanol was then added and the reaction mixture was agitated and grandually heated to about 65° C. The reaction mixture was then heated at about 65° C. for two hours to complete reaction. The resulting reaction product which was the desired Mannich Base compound was then vacuum distilled to remove water, methanol and other volatile materials. Vacuum distillation with heating was continued until a pot temperature of about 100° C. was reached. The Mannich Base compound was then held under full vacuum at about 100° C. for fifteen minutes and cooled to about 30° C. Analysis showed that the water content of the Mannich Base compound was 0.17% by weight. The Mannich Base compound contained five terminal hydroxyl groups, that is, one phenolic hydroxyl group and four alkanol hydroxyl groups.

(B) Preparation of a hydroxyl containing compound

A total of 328 g. (1 mole) of the Mannich Base compound obtained in part (A) above was charged into a glass flask equipped with agitator, reflux condenser and provisions for maintaining a nitrogen blanket over the Mannich Base compound was heated to about 95° C. with agitation and under a nitrogen blanket. Propylene oxide was then introduced under the nitrogen blanket and condensed with the Mannich Base compound at about 95° C. to about 110° C. until a total of five moles of propylene oxide had been condensed with one mole of the Mannich Base compound. The adduct contained five terminal hydroxyl groups, that is, four terminal hydroxyl groups and one hydroxyalkyl group wherein the five hydroxyl groups had been reacted with 4 moles of propylene oxide, PrO, that is, 5 OH/4 PrO.

EXAMPLE IV (A) Preparation of a Mannich Base compound

A mixture of 420 g. (4 moles) of diethanolamine and 180 g. of distilled water was charged into a glass flask equipped with agitator, reflux condenser and provisions for external heating and cooling. The diethanolamine mixture was cooled to about 10° C. A solution containing 326 g. (4.02 moles) of aqueous formaldehyde (37% by weight) and 180 g. of distilled water which had been neutralized to a pH of 8.1 with 30° Bé. sodium hydroxide solution was prepared. The formaldehyde solution was slowly added with agitation at a temperature of about 10° C. to about 15° C. over a period of one hour. After addition of the formaldehyde solution was complete, 880 g. (4 moles) of nonylphenol was added at about 10° C. to about 16° C. over a period of about fifteen minutes with vigorous agitation. The resulting reaction mixture was then agitated for one hour at about 10° C. to about 16° C. 933.3 g. of methanol was then added to the reaction mixture and the reaction mixture was heated to about 65° C. and agitated at about 65° C. for two hours to complete reaction. The resulting product which was the Mannich Base compound was then vacuum distilled to remove water, methanol and other volatile materials. Vacuum distillation was continued with heating until a pot temperature of about 100° C. was reached. The Mannich Base compound was then held under full vacuum at about 100° C. for fifteen minutes and then cooled to about 30° C. to obtain a compound containing 0.5% by weight water. The Mannich Base compound contained three hydroxyl groups, that is, one phenolic hydroxyl group and two alkanol hydroxyl groups.

(B) Preparation of a hydroxyl cointaining nitrogen compound

A total of 337 g. (1 mole) of the Mannich Base compound obtained in part (A) above was charged into a glass flask equipped with agitator, reflux condenser and provisions for maintaining a nitrogen blanket over the reactants and for external heating and cooling. The Mannich Base compound was then heated with agitation to about 95° C. under a nitrogen blanket. Propylene oxide was then introduced under the nitrogen blanket and condensed with the Mannich Base compound at about 95° C. to about 110° C. to form the desired hydroxy containing compound which was a propoxylate oxide adduct of Mannich Base compound. Propylene oxide addition was continued until a total of 116 g. (2 mole) of propylene oxide had condensed and reacted with one mole of the Mannich Base compound. The hydroxyl continuing nitrogen compound was the condensate of two moles of propylene oxide with one mole of the Mannich Base compound and contained three hydroxyl groups, that is, one hydroxyalkyl group and two alkanol hydroxyl groups which had been partially reacted with one mole of propylene oxide, PrO, that is, 3 OH/1 Pro.

(C) Preparation of a treating agent

To 453 g. (1 mole) of the hydroxyl containing nitrogen compound obtained in part (B) above was introduced 126 g. (1 mole) of dimethyl sulfate over a period of two hours while the reaction temperature was maintained at about 45° to about 55° C. After dimethyl sulfate addition was complete, the reaction mixture was agitated for three hours at about 50° C. to complete the reaction. The reaction product was a quaternary ammonium salt which was useful as a treating agent. 579 g. of distilled water was added to the reaction product with agitation and stirred for one hour at about 50° C. to obtain a 50% by weight solution of the quaternary treating agent.

EXAMPLE V

This example is directed to a determination of the antistatic properties of treating agents on synthetic yarns. A polyethylene terephthalate yarn having a denier of 220 and containing 50 filaments in the denier was treated with a treating agent which was an aqueous solution of the quaternary ammonium salt obtained in part (C) of Example IV above. The treating agent was applied in the form of an aqueous solution containing 0.53% by weight of the 100% active quaternary ammonium salt. The application was a single end application using the Butterworth Padding Machine with a 20 lb. roll presure at room temperature. The yarn was dried at 150° F. for forty-five minutes and coned. The wet pickup was predetermined to be 38% by weight of the solution and the treated yarn had a solids pickup of 0.1% by weight after drying based on the weight of the dry fiber.

The treated and untreated yarns were tested for antistatic properties after conditioning the yarns for twenty-four hours at 72° F. and 50% relative humidity. A potential of 180 volts was applied to each yarn by connecting the yarn to the positive and negative terminals of a battery. The connection was made by connecting the yarn with the positive and negative electrodes which were positioned 35 millimeters apart and were connected to the terminals of the battery. After the voltage was applied, the contact was broken and the charged yarn was connected to a voltmeter which indicated the voltage of the yarn. The time in seconds required for the voltage on the yarn to drop from 160 volts to 80 volts was measured and recorded as half-life seconds. If the treating agent on the yarn has good electrostatic properties, the voltage or charge on the yarn leaked off quickly after the contact was broken. The untreated yarn gave values of over 200,000 half-life seconds. The treated yarn, which contained 0.1% of the treating agent based on the weight of the dry yarn, gave values of 8 half-life seconds. These tests showed that treatment of synthetic yarns with the quaternary treating agents of this invention resulted in marked improvement in their antistatic properties, that is, the capacity of the yarn to retain electrostatic charges was greatly decreased.

EXAMPLE VI (A) Preparation of a Mannich Base compound

Into a glass lined kettle equipped with agitator, reflux condenser and provisions for cooling and heating, a mixture of 34.00 lbs. (0.324 mole) of diethanolamine and 6.48 lbs. of methanol was introduced. The mixture cooled to about 10° C. and 26.38 lbs. (0.33 mole) of aqueous formaldehyde solution (37% by weight active) was then slowly added over one hour while the temperature was maintained at about 10° C. to about 15° C. A mixture of 30.44 lbs. (0.32 mole) of phenol and 2.70 lbs. of methanol at a temperature between about 20° C. and about 25° C. was added with continuous stirring. This addition was made as a single feed. Cooling was removed and the temperature of the reaction mixture was allowed to rise to about 20° C. to about 25° C. The reaction mixture was then heated to raise the temperature to about 60° C. to about 65° C. Approximately two hours was required to heat the reaction mixture to about 65° C. The reaction mixture was then vacuum distilled to remove water, methanol and other volatile materials. The temperature was gradually raised during vacuum distillation until a final temperature of about 105° C. was reached. The reaction mixture was heated at about 105° C. for about fifteen minutes and then cooled to room temperature. The reaction product was the desired Mannich Base compound and contained about 0.3% water by weight. The Mannich Base compound contained three hydroxyl groups, that is, one phenolic hydroxyl group and two alkanol hydroxyl groups.

(B) Preparation of a hydroxyl containing nitrogen compound 21.1 lbs. (0.1 mole) of the Mannich Base compound obtained in part (A) above was charged into a glass flask equipped with agitator, reflux condenser and provisions for maintaining a nitrogen blanket over the reactants and for external heating and cooling. The Mannich Base compound was heated with agitation to about 95° C. under a nitrogen blanket. 14.5 lbs. (0.25 mole) of propylene oxide was then gradually introduced under the nitrogen blanket and condensed with the Mannich Base compound at about 100° C. to about 120° C. The resulting hydroxyl containing nitrogen compound was the addition product of 2.5 moles of propylene oxide with one mole of the Mannich Base compound. The adduct contained three hydroxyl groups, that is, two alkanol groups and one hydroxyalkyl group wherein the three hydroxyl groups had been partially reacted with propylene oxide, PrO, that is, 3 OH/1.5 PrO.

EXAMPLE VII

A mixture of 420 g. (4 moles) of diethanolamine and 180 g. of distilled water was charged into a glass flask equipped with agitator, reflux condenser and provisions for external heating and cooling. The diethanolamine mixture was cooled to about 10° C. A solution containing 326 g. (4.02 moles) of aqueous formaldehyde (37% by weight) and 180 g. of distilled water which had been neutralized to a pH of 8.1 with 30° Bé. sodium hydroxide solution was prepared. The formaldehyde solution was slowly added with agitation at a temperature of about 10° C. to about 15° C. over a period of one hour. After addition of the formaldehyde solution was complete, 880 g. (4 moles) of nonylphenol was added at about 10° C. to about 15° C. over a period of about fifteen minutes with vigorous agitation. The resulting reaction mixture was then agitated for one hour at about 10° C. to about 16° C. 933.3 g. of methanol was then added to the reaction mixture and the reaction mixture was heated to about 65° C. and agitated at about 65° C. for two hours to complete reaction. The resulting product which was the Mannich Base compound was then vacuum distilled to remove water, methanol and other volatile materials. Vacuum distillation was continued with heating until a pot temperature of about 100° C. was reached. The Mannich Base compound was then held under full vacuum at about 100° C. for fifteen minutes and then cooled to about 30° C. to obtain a compound containing 0.5% by weight water. The Mannich Base compound contained three hydroxy groups, that is, one phenolic hydroxyl group and two alkanoyl hydroxyl groups.

A total of 674 g. (2 moles) of the Mannich Base compound obtained above was charged into a glass flask equipped with agitator, reflux condenser and provisions for maintaining a nitrogen blacket over the reactants and for external heating and cooling. The Mannich Base compound was then heated with agitation to about 95° C.

under a nitrogen blanket. Propylene oxide was then introduced under the nitrogen blanket and condensed with the Mannich Base compound at about 95° C. to about 110° C. to form the desired hydroxyl containing compound which was a propoxylene oxide adduct of the Mannich Base compound. Propylene oxide addition was continued until a total of 221.5 g. (1.91 moles) of propylene oxide had condensed and reacted with one mole of the Mannich Base compound. The hydroxyl containing nitrogen compound was the condensate of two moles of propylene oxide with one mole of the Mannich Base compound and contained three hydroxyl groups, that is, one hydroxyalkyl phenoxy group and two alkanol hydroxyl groups which had been partially reacted with one mole of porpylene oxide, PrO, that is 3 OH/2 PrO. The molecular weight of this propoxylated Mannich Base was calculated based on the amine value after a non-aqueous base titration, and it was determined that one mole is 473 g.

EXAMPLE VIII

To 150 g. of the product of Example VII was introduced 40 g. (an equimolar amount) of dimethyl sulfate over a period of two hours while the reaction temperature was maintained at about 45° C. to 55° C. After dimethyl sulfate addition was complete, the mixture was agitated and heated yielding the following results:

| | |
|---|---|
| Heating time, hours | 3 |
| Temperature, ° C. | 50 |
| Reacted product, percent | 97.0 |
| Amine salts produced | Trace |

The amine salt evaluation was made by dissolving a sample of the reacted product in isopropyl alcohol as per an amine titration, adding phenolphthalein, and titrating with alcoholic sodium methylate.

EXAMPLE IX

To 150 g. of the product of Example VII was introduced 40.1 (an equimolar amount) of benzyl chloride over a period of two hours while the reaction temperature was maintained at about 45° C. to 55° C. After benzyl chloride addition was complete, the mixture was agitated and heated yielding the following results:

| Heating time, hrs. | Temperature, ° C. | Percent of reacted product | Amine salts produced, percent |
|---|---|---|---|
| 3 | 50 | 4.0 | |
| 2½ | 75–80 | 14.4 | |
| 7 | 75–80 | 41.3 | |
| 7 | 90–2 | 66.5 | 3.4 |
| 7 | 90–92 | 71.8 | 7.2 |
| 5½ | 100–105 | 72.0 | 17.3 |

The amine salt evaluation was made by dissolving a sample of the reacted product in isopropyl alcohol as per an amine titration, adding phenolphthalein, and titrating with alcoholic sodium methylate.

EXAMPLE X

To 100 g. of the product of Example VII was introduced 66.17 g. (an equimolar amount) of dodecylbenzyl chloride over a period of two hours while the reaction temperature was maintained at about 45° C. to 55° C. After dodecylbenzyl chloride addition was complete, the mixture was agitated and heated yielding the following results:

| Heating time, hrs. | Temperature, ° C. | Percent of reacted product | Amine salts produced, percent |
|---|---|---|---|
| 7 | 75–80 | 17.5 | |
| 7 | 90–92 | 50.4 | |
| 7 | 90–92 | 64.1 | 7.7 |
| 5½ | 100–105 | 69.1 | 23.9 |

The amine salt evaluation was made by dissolving a sample of the reacted product in isopropyl alcohol as per an amine titration, adding phenolphthalein, and titrating with alcoholic sodium methylate.

EXAMPLE XI

To 100 g. of the product of Example VII was introduced 44.4 g. (an equimolar amount) of lauryl chloride over a period of two hours while the reaction temperature was maintained at about 45° C. to 55° C. After lauryl chloride addition was complete, the mixture was agitated and heated yielding the following results:

| Heating time, hrs. | Temperature, ° C. | Percent of reacted product | Amine salts produced, percent |
|---|---|---|---|
| 6½ | 90–92 | No reaction | |
| 5½ | 100–105 | do | |

The amine salt evaluation was made by dissolving a sample of the reacted product in isopropyl alcohol as per an amine titration, adding phenolphthalein, and titrating with alcoholic sodium methylate.

EXAMPLE XII

The products of Examples VIII through XI were tested in the following manner.

Isopropanol solutions of the compositions were applied by padding to 200/34 extracted nylon filament yarn. Each sample of yarn was dried to remove the alcohol and was then conditioned for 24 hours at 50% relative humidity and 72° F. The conditioned, treated yarn, which contained 0.2% by weight of the composition based on the weight of the fiber, was evaluated to determine Antistatic Half Life. This evaluation is made by placing a 180 v. D.C. charge on the yarn and measuring and recording the time required for one half of the charge to dissipate from the yarn using an electrostatic voltmeter. A lower half life would therefore indicate that a substance is a better antistat, since it means that the charge is being dissipated more quickly.

The results are as follows:

| Product of example: | Half life (seconds) |
|---|---|
| VIII | 210 |
| IX | 2,300 |
| X | 5,000 |
| XI | 250 |

EXAMPLE XIII

Conclusions based upon Examples VII through XII.

The result obtained in Example VIII indicates that the product thereof was easily made in accordance with this invention in view of the fact that there was a 97% reaction after heating for only 3 hours at 50° C.

In contrast to the above, the results obtained in Examples IX and X, which are outside the scope of this invention, indicate that both of these products were considerably more difficult to make than that of Example VIII.

In Example IX, the maximum quaternization reaction that was achieved was 72% after heating for a total of 32 hours, which was accompanied by increasing amine salt product, thus indicating that further heating would not be productive.

In Example X, the maximum quaternization reaction that was achieved was 69.1% after heating for a total of 25½ hours, which was accompanied by an increasing amine salt product, thus indicating that further heating would not be productive.

In Example XI, no quaternization reaction was achieved, despite heating for 12 hours at up to 105° C. The failure of any reaction to take place indicates that the substance applied to the nylon filament in testing the product of Example XI was merely the unreacted propoxylated Mannich Base and it should be noted that the quaternary salt is a superior artistat as indicated by the fact that the quaternary salt is water-soluble whereas the propoxylated Mannich Base is not.

The table of Example XII, indicates that the lower alkyl sulfate quaternary salt and the unreacted Mannich Base were superior antistats to quaternary salts outside the scope of this invention by factors of about 10 and 20, respectively.

What I claim is:

1. A quaternized alkoxylated Mannich Base compound treating agent in which:
   (A) the Mannich Base compound is the reaction product of a phenol, an aldehyde and an alkanolamine wherein the aldehyde and alkanolamine are present in approximately equimolar amounts with respect to each other and are present in sufficient amounts to react with at least one reactive hydrogen atom in the phenol, there being present one mole each of aldehyde and alkanolamine for each reacting reactive hydrogen atom, wherein the reaction is at a temperature of from about 50° C. to about 110 C., and wherein
      (1) the phenol, having as its sole reactive moieties hydroxyl and hydrogen, is selected from the group consisting of phenol, naphthol, alkyl or phenyl substituted phenols having 1 or 2 reactive hydrogen atoms present in the nucleus, polyphenols linked by alkylene bridges having a maximum of two reactive hydrogen atoms in the nucleus of the first phenolic moiety and one reactive hydrogen atom in the nucleus of each remaining phenolic moiety, and alkyl or phenyl substituted polyphenols linked by alkylene bridges having a maximum of two reactive hydrogen atoms in the nucleus of the first phenolic moiety and one reactive hydrogen atom in the nucleus of each remaining phenolic moiety,
      (2) the aldehyde is selected from the group consisting of formaldehyde, paraformaldehyde, trioxane, hexamethylenetetramine, acetaldehyde, butyraldehyde, heptaldehyde, furfuraldehyde, chloral, alpha-ethyl-beta-propylacrolein, and benzaldehyde, and
      (3) the alkanolamine is selected from the group consisting of monoalkanolamines and dialkanolamines wherein the alkylene group of the alkanolamine has from two to twelve carbon atoms;
   (B) the alkoxylating agent is an epoxy containing material selected from the group consisting of ethylene oxide, propylene oxide, butylene oxide, hexylene oxide, octylene oxide, decylene oxide, dodecylene oxide, styrene oxide, glycidol, dicyclopentadiene dioxide, limonene dioxide, 3,4-epoxy-6-methyl cyclohexyl-methyl-3,4-epoxy-6-methylcyclohexanecarboxylate, the diepoxide of the diglycidol derivative of 4,4'-dihydroxy-diphenyldimethyl methane, and epoxidized soybean oil containing 7% by weight of oxide, which is reacted with the Mannich Base compound at a temperature of from about 30° C. to about 200° C. and is present in an amount whose minimum is one mole for each phenolic hydrogen moiety present in the Mannich Base compound and whose maximum is
      (1) two moles for each phenolic hydroxyl moiety and one mole for each alkanol hydroxyl moiety, present in the Mannich Base compound, or
      (2) one mole for each phenolic hydroxyl moiety with the addition of from one to one hundred and fifty moles of a second alkoxylating agent for each phenolic hydroxyl moiety and from one to one hundred and fifty moles of the second alkoxylating agent for each alkanol hydroxyl moiety, present in the Mannich Base compound, with the proviso that the second alkoxylating agent is ethylene oxide, propylene oxide, butylene oxide, or styrene oxide; and
   (C) the quaternizing agent is selected from the group consisting of lower alkyl halides and lower alkyl sulfates present in an amount sufficient to react with at least one nitrogen atom present in the Mannich Base compound, reacted together at a temperature of from about 25° C. to about 150° C.

2. A treating agent according to claim 1 in which the Mannich Base compound is the reaction product of phenol, formaldehyde and diethanolamine.

References Cited

UNITED STATES PATENTS

| | | | |
|---|---|---|---|
| 2,998,452 | 8/1961 | Benson et al. | 260—570.9 |
| 3,297,597 | 1/1967 | Edwards et al. | 260—570.9 X |
| 3,024,283 | 3/1962 | Metcalfe et al. | 260—567.6 M |
| 3,123,640 | 3/1964 | Longley | 260—567.6 M |

FOREIGN PATENTS

| | | | |
|---|---|---|---|
| 906,409 | 9/1962 | Great Britain | 260—567.6 M |
| 697,174 | 11/1964 | Canada | 260—567.6 M |

OTHER REFERENCES

Kirk-Othmer Encyclopedia of Chem. Technology, vol. 11 (1953), pp. 375, 377, 379, 380, 387 and 388.

JOSEPH E. EVANS, Primary Examiner

U.S. Cl. X.R.

162—158; 252—8.57, 8.75; 260—77.5 AP, 404.5, 459, 471 R, 567.6 M, 567.6 P, 567.6 B

UNITED STATES PATENT AND TRADEMARK OFFICE
CERTIFICATE OF CORRECTION

PATENT NO. : 3,790,606

DATED : February 5, 1974

INVENTOR(S) : Lucien Sellet

It is certified that error appears in the above-identified patent and that said Letters Patent are hereby corrected as shown below:

Column 3, line 3, "radicals" should be --radical--; column 3, line 46, "phonolic" should be --phenolic--. Column 8, Formula (XI), line 56, "$CH_2$—H" should be --$CH_2$—N--. Column 12, line 48, "retaining" should be --retanning--. Column 13, line 11, "sulfons" should be --sulfone--. Column 15, line 66, "grandually" should be --gradually--. Column 16, line 11, after "the" insert the following: --reactants and for external heating and cooling. The--; column 16, line 69, "propoxylate" should be --propoxylene--. Column 17, line 2, after "alkyl" insert --phenoxy--. Column 19, line 15, "porpylene" should be --propylene--; column 19, line 51, in the Table, under the heading, "Temperature, °C.", "90-2" should be --90-92--. Column 21, line 1, "artistat" should be --antistat--.

Signed and Sealed this

Eighth Day of March 1977

[SEAL]

Attest:

RUTH C. MASON
Attesting Officer

C. MARSHALL DANN
Commissioner of Patents and Trademarks